United States Patent
Canini et al.

(10) Patent No.: US 10,970,502 B2
(45) Date of Patent: Apr. 6, 2021

(54) DATA COLLECTION SYSTEMS AND METHODS TO CAPTURE IMAGES OF AND DECODE INFORMATION FROM MACHINE-READABLE SYMBOLS

(71) Applicant: Datalogic IP Tech, S.r.l., Bologna (IT)

(72) Inventors: Federico Canini, Bologna (IT); Simone Spolzino, Bologna (IT); Marco Bozzoli, Bologna (IT); Luca Perugini, Bologna (IT)

(73) Assignee: Datalogic IP Tech, S.r.l., Bologna (IT)

( * ) Notice: Subject to any disclaimer, the term of this patent is extended or adjusted under 35 U.S.C. 154(b) by 0 days.

(21) Appl. No.: 16/618,717

(22) PCT Filed: Jun. 7, 2017

(86) PCT No.: PCT/IT2017/000114
§ 371 (c)(1),
(2) Date: Dec. 2, 2019

(87) PCT Pub. No.: WO2018/225100
PCT Pub. Date: Dec. 13, 2018

(65) Prior Publication Data
US 2020/0125812 A1    Apr. 23, 2020

(51) Int. Cl.
*G06K 9/80* (2006.01)
*G06K 7/10* (2006.01)
*G06K 7/14* (2006.01)

(52) U.S. Cl.
CPC ....... *G06K 7/10722* (2013.01); *G06K 7/1417* (2013.01)

(58) Field of Classification Search
USPC ............... 235/462.11, 462.1, 462.24, 462.25
See application file for complete search history.

(56) References Cited

U.S. PATENT DOCUMENTS 6,000,612 A   12/1999  Xu
6,036,095 A    3/2000  Seo
(Continued)

FOREIGN PATENT DOCUMENTS

EP    1866735 B1    6/2010

OTHER PUBLICATIONS

International Search Report and Written Opinion of the International Searching Authority, dated Feb. 12, 2018, issued in corresponding International Application No. PCT/IT2017/000114, filed Jun. 7, 2017, 9 pages.

*Primary Examiner* — Daniel St Cyr
(74) *Attorney, Agent, or Firm* — Cozen O'Connor

(57) ABSTRACT

Systems and methods for providing additional processing capabilities related to machine-readable symbols. A data collection system (100) may include a scan engine (102), auxiliary image processor (104), auxiliary visualizer (106), and host system (108). The scan engine may output decoded information obtained from a representation of a machine-readable symbol captured by a two-dimensional image processor. The scan engine may also output a set of images related to the machine-readable symbol and an object associated with the machine-readable symbol, in which the set of images may form a streaming set of images or streaming video. The set of images may be used by the auxiliary image processor to obtain further information about the machine-readable symbol and/or associated object, such as OCR or DWM information. The set of images may be stored and made accessible by the auxiliary visualizer. The host system may synchronize a display of the images and decoded data output by the scan engine.

20 Claims, 4 Drawing Sheets

(56) References Cited

U.S. PATENT DOCUMENTS

| | | | |
|---|---|---|---|
| 7,111,787 B2* | 9/2006 | Ehrhart | G06K 7/10851 |
| | | | 235/454 |
| 8,011,584 B2* | 9/2011 | Powell | G06K 7/10732 |
| | | | 235/455 |
| 8,873,892 B2* | 10/2014 | Negro | G06K 9/228 |
| | | | 382/313 |
| 9,373,016 B2* | 6/2016 | Canini | G06K 7/10732 |
| 2009/0108074 A1 | 4/2009 | Vinogradov | |

* cited by examiner

DATA COLLECTION SYSTEMS AND METHODS TO CAPTURE IMAGES OF AND DECODE INFORMATION FROM MACHINE-READABLE SYMBOLS

TECHNICAL FIELD

The present disclosure relates to data collection systems and methods used to capture images and to decode information related to machine-readable symbols and associated objects.

BACKGROUND

Description of the Related Art

Automated processes have become widespread in manufacturing, shipping, and other warehouse-type facilities. For example, automated sorters may sort items into different bins or categories as those items are conveyed along an assembly line or conveyor belt. As another example, a conveyor belt may be used to transport items between different manufacturing stations. Such sorting and conveying may be facilitated by machine-readable symbols that may be affixed or otherwise associated with the various items being sorted and conveyed. In such instances, machine-readable symbol readers may decode the information contained within the machine-readable symbols and use such information to track and/or sort the item associated with the machine-readable symbol.

BRIEF SUMMARY

Machine-readable symbol readers may have a limited capacity to detect, decode, and process the information stored on the machine-readable symbols attached to or carried by objects being conveyed along a conveyor or assembly line. In such instances, the machine-readable symbol reader may have sufficient time to decode only part of the information in the machine-readable symbol. In addition, as more and more automated processes are included within shipping and manufacturing facilities, workers may not be present to quickly detect and address a malfunctioning machine or errant process. Thus, providing the ability to remotely verify the operation of various automated machines and processes located and occurring along an assembly line or conveyor is increasingly important. Accordingly, providing the ability to capture images, including streaming images and videos, of the objects and associated machine-readable symbols being conveyed past the machine-readable symbol reader, and remotely process and store such images, may be used to enhance the capabilities provided by the machine-readable symbol reader.

A data collection system may be summarized as including: a scan engine, the scan engine including: a two-dimensional image sensor having a field-of-view, and which in operation captures a sequence of frames of two-dimensional images; a set of image processor circuitry, the set of image processor circuitry communicatively coupled to the two-dimensional image sensor to receive at least some of the frames of two-dimensional images therefrom, and which in operation logically associates a respective identifier with each of the frames of two-dimensional images, the respective identifier which uniquely identifies the respective frame of the two-dimensional images for other ones of the frames of two-dimensional images in the sequence of frames of two-dimensional images; a set of decoding processor circuitry, the set of decoding processor circuitry directly or indirectly communicatively coupled to the two-dimensional image sensor to receive at least some of the frames of two-dimensional images therefrom, and which in operation decodes a number of machine-readable symbols represented in the frames of two-dimensional images; a first output interface, the first output interface communicatively coupled to the set of image processor circuitry to provide, therefrom, a set of the frames of two-dimensional images with the respective identifiers; and a second output interface, the second output interface communicatively coupled to the set of decoding processor circuitry to provide, therefrom, information decoded from machine-readable symbols by the set of decoding processor circuitry, in parallel with the stream of the frames of two-dimensional images with the respective identifiers.

The set of decoding processor circuitry may be indirectly communicatively coupled to the two-dimensional image sensor via the set of image processor circuitry. To logically associate a respective identifier with each of the frames of two-dimensional images, the set of image processor circuitry may insert the respective identifier into each of the frames of two-dimensional images. To logically associate a respective identifier with each of the frames of two-dimensional images, the set of image processor circuitry may insert a respective frame identifier into each of the frames of two-dimensional images. To logically associate a respective identifier with each of the frames of two-dimensional images, the set of image processor circuitry may insert a respective time stamp into each of the frames of two-dimensional images. To logically associate a respective identifier with each of the frames of two-dimensional images, the set of image processor circuitry may modify a number of pixels within each of the frames. To logically associate a respective identifier with each of the frames of two-dimensional images, the set of image processor circuitry may encode the respective identifier into optical black pixels for each frame. The set of image processor circuitry may be a field programmable gate array. The set of image processor circuitry may be a mobile industry processor interface (MIPI) bridge. The set of decoding processor circuitry may include at least one central processor unit, at least one random access memory, and at least one nonvolatile memory, the at least one random access memory and the at least one nonvolatile memory communicatively coupled to the at least one central processor unit. The first output interface may provide the stream of the frames of two-dimensional images as raw two-dimensional images as captured by the two-dimensional image sensor, with only the respective identifiers appended thereto. The scan engine may be an integral module. The first output interface may be a video interface and the second output interface may be one or more of a USB interface and an RS232 interface.

The data collection system may further include at least a first auxiliary image processor, the first auxiliary image processor communicatively coupled to the first output interface to receive the set of frames of two-dimensional images, wherein the first auxiliary image processor further includes a set of data management processing circuitry which in operation performs one or more computational tasks related to the two-dimensional images in one or more of the frames in the set of frames of two-dimensional images.

The data collection system may further include at least a first auxiliary visualizer, the first auxiliary visualizer communicatively coupled to the first output interface to receive the set of frames of two-dimensional images, wherein the first auxiliary visualizer stores one or more frames from the set of frames of two-dimensional images.

The data collection system may further include a host system, the host system communicatively coupled, directly or indirectly, to the first output interface to receive the set of frames of two-dimensional images, at least one machine-readable symbol represented in the set of frames of two-dimensional images, and the host system communicatively coupled, directly or indirectly, to the second output interface to receive decoded information related to the at least one represented machine-readable symbol, the host system to synchronize a display of the set of frames of two-dimensional images in which the at least one machine-readable symbol is represented with the decoded information related to the at least one machine-readable symbol.

The data collection system may further include a set of user interface processor circuitry on the host system, the user interface processor circuitry in operation to control the display of the frames of two-dimensional images based on an input signal associated with a user.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with scan engines, imagers, decoding circuitry, and/or machine-readable symbol readers have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Figure 1:
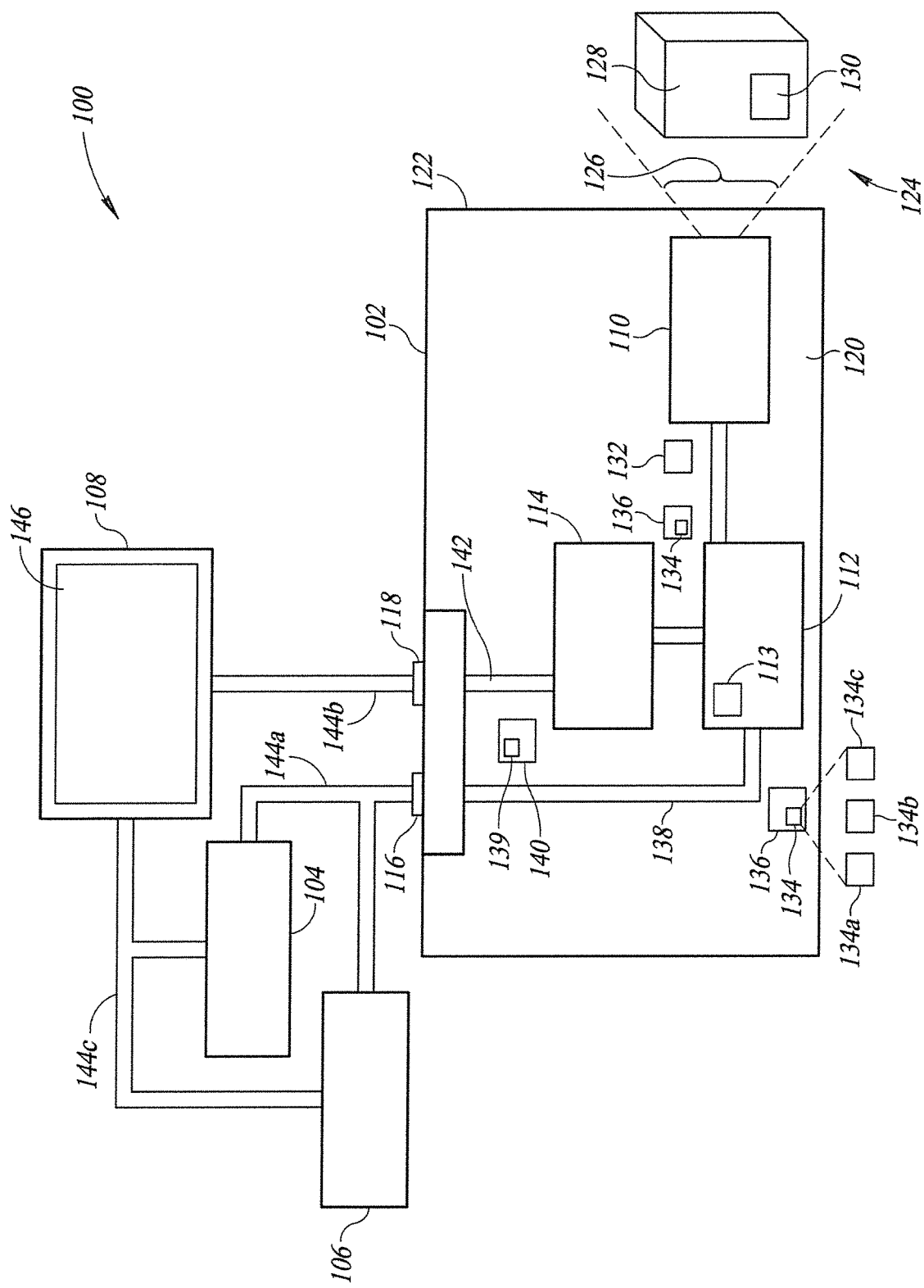
FIG. 1 is a block diagram of a data collection system that includes a scan engine, an auxiliary image processor, an auxiliary visualizer, and a host system, the scan engine positioned to image a machine-readable symbol carried by an object, according to at least one illustrated implementation.

FIG. 1 shows a data collection system 100 that includes a scan engine 102, an auxiliary image processor 104, an auxiliary visualizer 106, and a host system 108. The scan engine 102 includes a two-dimensional image sensor 110, a set of image processor circuitry 112, a set of decoding processor circuitry 114, a first output interface 116, and a second output interface 118. The scan engine 102 may have one or more side walls 120 that delineate an interior 122 of the scan engine 102, and separate the interior 122 of the scan engine 102 from an exterior 124 of the scan engine 102. As shown in FIG. 1, the scan engine 102 may form an integral component in which all of the components of the scan engine 102 are located in the same structure. In some implementations, at least some of the components of the scan engine 102 may be located remotely from the other components of the scan engine 102. For example, in some implementations, the two-dimensional image sensor 110 may be in one location with one or more of the set of image processor circuitry 112 and the set of decoding processor circuitry 114 being in one or more remote locations separate from the two-dimensional image sensor 110.

In some implementations, some or all of the processes performed by each of the two-dimensional image sensor 110, the set of image processor circuitry 112, and the set of decoding processor circuitry 114 may be executed by one processor or by multiple processors. In such implementations in which multiple processors execute processes for the two-dimensional image sensor 110, the set of image processor circuitry 112, and/or the set of decoding processor circuitry 114, such multiple processors may be located within a plurality of distributed processing units (e.g., computer systems or servers) that may be communicatively coupled via one or more communications networks. Such communications networks may include, for example, various types of local area networks (LANs) and/or wide area networks (WANs).

The two-dimensional image sensor 110 may include a set of one or more transducers that convert light, such as light in the visible spectrum, into electrical voltages. In some implementations, for example, the two-dimensional image sensor 110 may be comprised of one or more transducers (e.g., array of charge coupled devices or CCD array) that convert the amount of received light to a voltage value. The two-dimensional image sensor 110 may have a field-of-view 126 in which two-dimensional image sensor 110 may capture images. For example, the two-dimensional image sensor 110 may be used to capture images of objects 128 located within the image-sensor field-of-view 126. In some instances, at least some of the objects 128 may have one or more machine-readable symbols 130 located on or attached to the object 128. In such instances, the image captured by the two-dimensional image sensor 110 may include a representation of the machine-readable symbol 130. Such machine-readable symbols 130 may include, for example, barcode symbols, Quick Response symbols, other forms of two-dimensional machine-readable symbols, or any other similar visual representation of data that may be captured and decoded by a machine or processor.

The two-dimensional image sensor 110 may output a set of frames 132 of two-dimensional images captured by the two-dimensional image sensor 110. Such images may include images of objects 128, or portions thereof, located within the field-of-view 126 of the two-dimensional image sensor 110. Such images may further or alternatively include representations of machine-readable symbols 130 associated with such objects 128. In some implementations, the two-dimensional image sensor 110 may capture and output up to 60 frames or more per second, with the set of frames 132 forming a video stream output. In some implementations, the two-dimensional image sensor 110 may capture and output between 10 and 60 frames per second as a set of frames 132 that may form a sequence of two-dimensional images that form a video stream output. In some implementations, the two-dimensional image sensor 110 may capture and output fewer than 10 frames per second (e.g., one frame per second) as a set of frames 132 that may form a sequence of two-dimensional images. The two-dimensional image sensor 110 may output the frames 132 as part of a raw video or image stream in which the data captured by the two-dimensional image sensor 110 has been minimally processed. Such a raw video or image stream may be output using any number of formats, such as, for example, TIFF/EP (as specified by ISO 12234-2), Digital Negative (DNG) format, Nikon Electronic Format (NEF), RAW8/ROW 10 MONOCROME or RAW RGB888 formats, and other similar raw image and/or video formats. The image data included within each frame 132 output by the two-dimensional image sensor 110 may comprise a plurality of pixels wherein each pixel includes 8-, 16-, 32-, or more bits of color or grayscale data. In some implementations, the two-dimensional image sensor 110 may output images having a resolution of up to 1 Mega-pixels (e.g., images for a 640×480 pixel VGA display), between 1 Mega-pixels and 8 Mega-pixels, or over 8 Mega-pixels.

The two-dimensional image sensor 110 may communicatively couple to the image processor circuitry 112. The image processor circuitry 112 may include one or more processor-readable memories 113, such as, for example, one or more of random access memories (RAM), registers, and/or Flash memories. The image processor circuitry 112 may be operable to logically associate metadata, such as, for example, an identifier 134, with each of the frames 132 in the set of frames 132 captured by the two-dimensional image sensor 110, resulting in a set of identified frames 136. The image processor circuitry 112 may be implemented using a field programmable gate array (FPGA) or a complex programmable logic device (CPLD) that has been appropriately programmed to process the sets of frames and/or the video stream received from the two-dimensional image sensor 110. Such an implementation may advantageously provide for faster processing times as compared to enacting the image processor circuitry 112 using a software-based implementation. In some implementations, the image processor circuitry 112 may be implemented using a Mobile Industry Processor Interface (MIPI) bridge that may be programmed to incorporate the appropriate identifier 134 into each frame 132 received from the two-dimensional image sensor 110. In some implementations, the MIPI bridge and/or FPGA and/or CPLD may convert the set of frames 132 and/or 136 into a video format to be rendered by a display device.

In some implementations, the identifier 134 associated with each of the frames 132 within a set of frames captured by the two-dimensional image sensor 110 may be unique only with respect to each of the other frames 132 contained within the same set of frames 132. In some implementations, by contrast, the identifier 134 associated with each of the frames within a set of frames captured by the two-dimensional image sensor 110 may be unique with respect to other frames 132 contained in multiple sets of frames captured by one or more two-dimensional images sensors 110. The identifier 134 may include one or more of a frame identifier 134a (e.g., a sequentially increasing frame number), a timestamp 134b (including, for example, one or more of year, month, day, hour, minute, second, fraction of a second, and/or clock time) related to the image capture time, a hash 134c based at least in part on time the image capture time, or any other similar identification process. In some implementations, the identifier 134 may include additional information, such as an identifier of the scan engine 102 used to capture the images, the location (e.g., latitude/longitude) of the scan engine 102 and/or the area encompassed by the field-of-view 126 for the scan engine 102 that captured the images, the name of a component or process within the field-of-view 126, or any other such identification information.

In some implementations, the image processor circuitry 112 may logically associate the identifier 134 into the frame 132 by modifying the data associated with one or more pixels in the respective frame 132. For example, in some implementations, the image processor circuitry 112 may insert the identifier 134 into the respective frame 132 by modifying at least some of the pixel data (e.g., bits) captured by the two-dimensional image sensor 110. As such, the image processor circuitry 112 may modify one or more bits within one or more pixels to insert the identifier 134 into the associated frame 132. In some implementations, modifying a small number of bits for multiple pixels may result in a change in color for the modified pixels that is imperceptible, or almost imperceptible, to a user. In some implementations, the modified pixels may be located along the edge of the image output by the two-dimensional image sensor 110 further reducing any impact the modified pixels may have on user perception of the modified image.

In some implementations, the image processor circuitry 112 may insert the identifier 134 into a frame by modifying pixels located within areas or lines of optical black pixels, such as those optical black pixels that may be used to correct image distortions, noise, or other artifacts that may occur in the image. Such optical black pixels may be read as providing a black color regardless of the data associated with the pixel. In some implementations, the images may include one or more columns or rows of optical black pixels. In some implementations, the frame 132 may include one or more areas of optical black pixels located along one or both of the sides of the image, outside of the portion of the image to be rendered on a display. In such an implementation, the identifier 134 may be inserted into the frame 132 by modifying the pixel values for one or more of the optical black pixels. Because the optical black pixels are rendered as black when the image is displayed, modifying one or more of the optical black pixels to insert the identifier 134 into the frame may not result in any change to the final image rendered for a user.

The image processor circuitry 112 may optionally process the frames within the raw video or image stream received from the two-dimensional image sensor 110 to output the set of identified frames 136 in a video or image format that may be rendered by a display device. Such formats may include, for example, WVGA formatted video, TIFF formatted images, or other similar video or image formats. In some implementations, the image processor circuitry 112 may perform no further or minimal further processing on frames 132 within the raw video or image stream. For example, in some implementations, the image processor circuitry 112 may output a raw video and/or image stream with no further processing. In some implementations, the image processor circuitry 112 may perform minimal processing on the raw video and/or image stream, such as, for example, appending the identifier 134 to each frame 132, or adding supplemental meta-data content appended or embedded into the image.

In some implementations, the image processor circuitry 112 may identify and capture a region-of-interest within one or more of the frames 136 in the set of identified frames 136. Such a region-of-interest may include, for example, a region in which at least some of the machine-readable symbol 130 has been captured. In such an implementation, one or more of the frames 136 in the set of identified frames 136 may be subdivided into different regions, with only a subset of the regions (e.g., those regions in which a region-of-interest has been fully or partially captured) being further processed as the set of identified frames 136.

In some implementations, the image processor circuitry 112 communicatively couples to either or both of the first output interface 116 and the set of decoding processor circuitry 114. The image processor circuitry 112 may communicatively couple to the first output interface 116 via a video bus 138, such as, for example, a MIPI CSI-2 video bus. The first output interface 116 may be any type of output connector that may be used to transmit image and/or video data to the auxiliary image processor 104, and/or the auxiliary visualizer 106 via, for example, any type of connector that may be used to transmit the signal from the video bus 138 (e.g., MIPI CSI-2).

The set of decoding processor circuitry 114 may communicatively couple to and receive the set of identified frames 136 from the image processor circuitry 112. In such an implementation, the set of decoding processor circuitry 114 may be indirectly coupled to the two-dimensional image sensor 110. The set of decoding processor circuitry 114 may further process at least some of the identified frames 136 received from the image processor circuitry 112. For example, the set of decoding processor circuitry 114 may analyze one or more of the identified frames 136 included within the set of identified frames 136 to determine if the image contained within the identified frame 136 depicts a representation of a machine-readable symbol 130. In some implementations, the set of decoding processor circuitry 114 may not analyze all of the identified frames 136 received from the image processor circuitry 112. In some implementations, for example, the rate at which the set of decoding processor circuitry 114 analyzes identified frames 136 may depend, at least in part on, the rate at which objects 128 pass through the field-of-view 126 of the two-dimensional image sensor 110. For example, if objects 128 pass in front of the field-of-view 126 of the two-dimensional image sensor 110 at a rate of one object 128 per second, then the set of decoding processor circuitry 114 may analyze identified frames 136 at a rate of two (or three) identified frames 136 per second to determine if any of the images in these frames depicts a representation of a machine-readable symbol 130. In some implementations, the rate at which the set of decoding processor circuitry 114 analyzes identified frames 136 may depend, at least in part, on the complexity of the machine-readable symbol 130 that may be subject to analysis. If the set of decoding processor circuitry 114 determines that the image contains no representations of machine-readable symbols 130, then the set of decoding processor circuitry 114 may perform no further processing on that frame 136.

If the set of decoding processor circuitry 114 determines that a representation of a machine-readable symbol 130 is present, then the set of decoding processor circuitry 114 may further analyze the image depicting the representation of the machine-readable symbol 130 to determine if the image is sufficiently clear for the set of decoding processor circuitry 114 to decode some or all of the information contained in the machine-readable symbol 130. If the set of decoding processor circuitry 114 determines that the image of the representation of the machine-readable symbol 130 is sufficiently clear, then the set of decoding processor circuitry 114 may decode at least some of the information contained within the representation of the machine-readable symbol 130.

The set of decoding processor circuitry 114 may output decoded information 139 obtained from the representation of a machine-readable symbol 130 captured in an identified frame 136. Such decoded information may be output in one or more data packets 140 via the second output interface 118. Such data packets 140 may be transmitted to the second output interface 118 via a data or communications bus 142. The data packets 140 may also include additional information related to the identified frame 136, such information related to the identifier 134 inserted into the identified frame 136 by the image processor circuitry 112. The second output interface 118 may include one or more interfaces that may be used to connect to a data or communications network, such as, for example, a Universal Serial Bus (USB) interface, a RS-232 interface, or any other wireless or wired interface that may connect using, for example, Wi-Fi, Ethernet, Bluetooth, ZigBee or any other acceptable communication protocol.

The scan engine 102 may output the video and/or images from the first output interface 116 in parallel (e.g., temporally concurrent) with the data output by the second output interface 118. In some implementations, the image processor circuitry 112 may supply identified frames 136 to both the first output interface 116 and to the set of decoding processor circuitry 114 at or about the same time. In such an implementation, the output of the first output interface 116 may not be synchronized with the output of the second output interface 118. Synchronization in this instance may be performed by a later device, such as, for example, the host system 108, based on the identifier 134 included within both the video and/or image stream output from the first output interface 116 and the decoded information 139 output from the second output interface 118. In some implementations, the scan engine 102 may synchronize the video and/or images being output via the first output interface 116 with the data being output by the second output interface 118 so that both outputs correspond to the same identified frame 136. In such an implementation, the image processor circuitry 112 may store the output of the video or image stream containing the identified frame 136 in the processor-readable memories 113 until the set of decoding processor circuitry 114 has decoded the representation of the machine-readable symbol 130.

The first output interface 116 may communicatively couple to one or both of the auxiliary image processor 104 and the auxiliary visualizer 106 via a communications connection 144*a*. In some implementations, the communications connection 144*a* may be a video bus, such as a MIPI CSI-2 bus. In some implementations, the first output interface 116 may include a converter (not shown) that converts data carried by a video bus, e.g., a MIPI CSI-2 bus, to data that may be carried on other types of communications networks. In such an implementations, the communications connection 144*a* may be part of a suitable communications network (e.g., LAN, WAN, Internet, Worldwide Web, cellular network, USB®, Bluetooth®, Bluetooth® Low Energy, WIFI®, NFC). In some implementations, the communications connection 144*a* may use one or more parallel cables, serial cables, or wireless channels capable of high speed communications, for instance, via one or more of FireWire®, Universal Serial Bus® (USB), Thunderbolt®, or Gigabyte Ethernet®, for example. In some implementations, the auxiliary image processor 104 and the auxiliary visualizer 106 may be included within the same processing unit (e.g., computer system or server). In some implementations, at least some of the processes performed by one or both of the auxiliary image processor 104 and the auxiliary visualizer 106 may be executed by multiple, distributed processing units (e.g., computer system or server) that may be communicatively coupled via one or more communications networks.

The auxiliary image processor 104 may perform further processing on the image contained within the identified frames 136 transmitted by the image processor circuitry 112. For example, in some implementations, the auxiliary image processor 104 may be used to perform optical character recognition (OCR) on the images contained within the identified frames 136. Such an OCR process may be used to obtain additional information about the objects 128 included within the images captured by the two-dimensional image sensor 110 and transmitted as part of the set of identified frames 136. In some implementations, the auxiliary image processor 104 may be used to identify and confirm the presence of digital watermarks (DWM) incorporated into or attached to the object 128 included within the images captured by the two-dimensional image sensor 110 and transmitted as part of the set of identified frames 136. Such DWM data may be used to confirm the authenticity of such objects 128.

In some implementations, the auxiliary image processor 104 may decode the information from the representations of the machine-readable symbols 130 included within the images captured by the two-dimensional image sensor 110 and transmitted as part of the set of identified frames 136. The decoded information may be used, for example, to confirm the processing and the results obtained by the set of decoding processor circuitry 114. In some implementations, the decoding of the representations of the machine-readable symbols 130 may be distributed such that the set of decoding processor circuitry 114 in the scan engine 102 decodes a first set of representations of machine-readable symbols 130 and the auxiliary image processor 104 decodes a second set of representations of machine-readable symbols 130. The first set and the second set of representations of machine-readable symbols 130 may be non-overlapping or partially overlapping. Such distributed decoding may be used to increase the number of identified frames 136 that may be decoded by the data collection system 100. In some implementations, the auxiliary image processor 104 may perform some or all of the above processes.

In some implementations, the auxiliary image processor 104 may store the identified frames 136 transmitted by the set of image processor circuitry 112. In some implementations, the auxiliary image processor 104 implements a structured database system that may provide for quick and efficient searching of the identified frames 136 stored by the auxiliary image processor 104, based for example upon the identifier 134. In some implementations, the auxiliary image processor 104 may store individual identified frames 136 as still images (e.g., TIFFs) and/or sets of identified frames 136 as video. In some implementations, the auxiliary image processor 104 may accept search criteria from, for example, the host system 108 requesting specific individual identified frames 136 or sets of identified frames 136. The auxiliary image processor 104 may use conventional database searching techniques to locate and retrieve the requested identified frames 136. Such storage may be particularly useful, for example, for images related to specific processes that may be studied and analyzed "on-demand" to optimize system performance and/or to implement diagnostic services.

In some implementations, the auxiliary visualizer 106 may provide an auxiliary display that may be used to display the video and/or image stream received via the communications connection 144*a*. Such an auxiliary visualizer 106 may be useful, for example, to view the raw video and/or image streams being captured by the scan engine 102 before additional data and information is provided on the display, as discussed below in connection with the host system 108.

The host system 108 may communicatively couple to one or more of the scan engine 102, to the auxiliary image processor 104, and/or to the auxiliary visualizer 106 via one or more of the communications connections 144*b*, 144*c*. The communications connection 144*b*, 144*c* may be part of a suitable communications network (e.g., LAN, WAN, Internet, Worldwide Web, cellular network, USB®, Bluetooth®, Bluetooth® Low Energy, WIFI®, NFC). In some implementations, the communications connection 144*b*, 144*c* may use one or more parallel cables, serial cables, or wireless channels capable of high speed communications, for instance, via one or more of FireWire®, Universal Serial Bus® (USB), Thunderbolt®, or Gigabyte Ethernet®, for example.

The host system 108 may provide a user interface 146 to enable a user to interact with the data, frames 132, 136, and streaming images and/or video obtained by the other components of the data collection system 100. In some implementations, for example, the user interface 146 may provide a live or near-live video stream of the images captured by the two-dimensional image sensor 110. In some implementations, the host system 108 may synchronize the display of the video stream with the decoded information 139 received from the set of decoding processor circuitry 114 such that the decoded information 139 may be displayed on the user interface 146 along with the image of the object 128 associated with the decoded information 139. In some implementations, the user interface 146 may enable the host system 108 to transmit a request to the auxiliary image processor 104 to request additional information about an object 128 related to a representation of a machine-readable symbol 130 captured by the two-dimensional image sensor 110. In some implementations, the user interface 146 may enable the host system 108 to transmit a request to the auxiliary visualizer 106 to request stored images and/or video for an object 128 related to a representation of a machine-readable symbol 130 captured by the two-dimensional image sensor 110. Such requests may be based, for example, on the identifier 134 inserted and/or incorporated into, or otherwise logically associated with, one or more of the identified frames 136.

Figure 2:
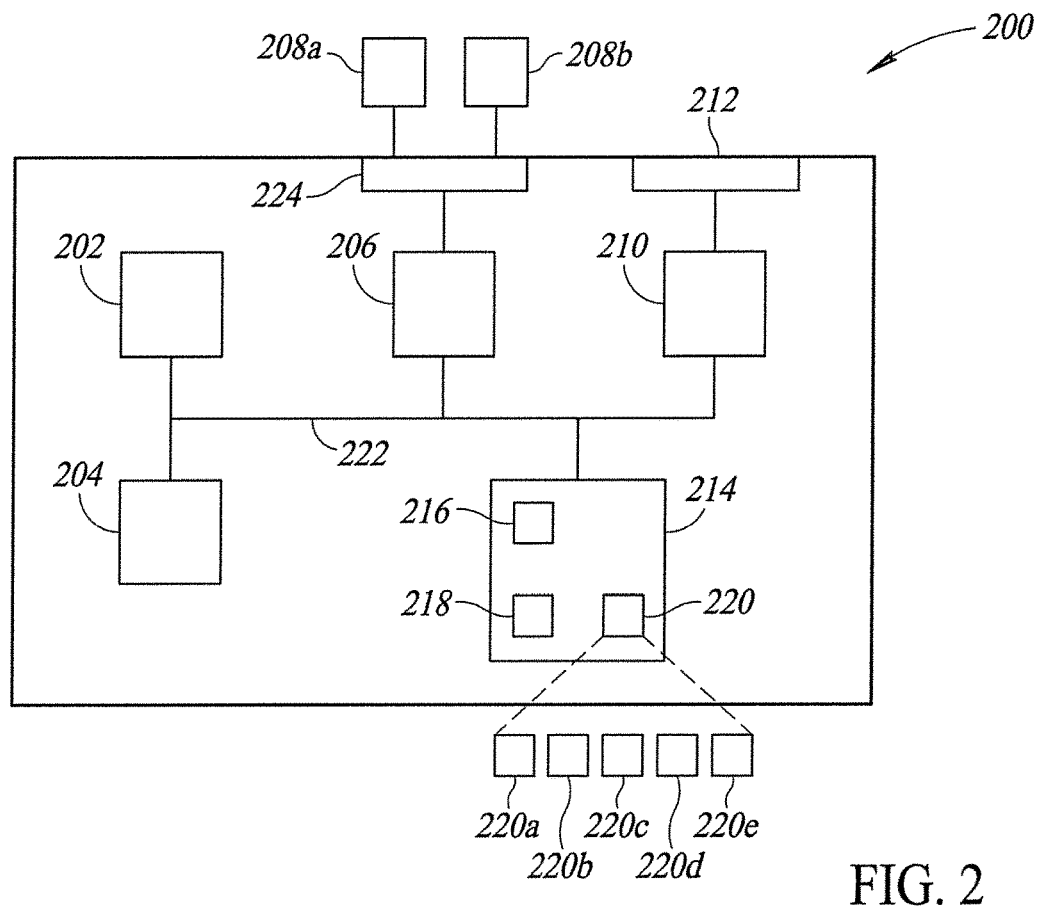
FIG. 2 is a block diagram of a processing unit that may be used, for example, to implement one or more of the host system, the auxiliary image processor, and/or the auxiliary visualizer in a data collection system, according to at least one illustrated implementation.

FIG. 2 shows a processing unit 200 that may be used, for example, to implement one or more of the host system 108, the auxiliary image processor 104, and/or the auxiliary visualizer 106 in the data collection system 100, according to at least one illustrated implementation. The processing unit 200 may include at least one processor 202, a power supply 204, an input/output controller 206 and associated input/output devices 208, a network interface controller 210 and associated transceiver 212, and one or more processor-readable memories 214 that store data 216, an operating system 218, one or more applications 220. Each of these components may be communicatively connected by bus(es) 222, which can provide bidirectional communication between the various components of the processing unit 200. Bus(es) 222 may take, for example, the form of a plurality of buses (e.g., data buses, instruction buses, power buses) included in at least one body.

The processor(s) 202 may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), complex programmable logic devices (CPLD), and the like. The at least one processor 202 may be referred to in the singular, but may be two or more processors. The processing unit 200 may also include one or more power supplies 204, which provide electrical power to the various components of the processing unit 200 via power connections. The power supplies 204 may be an internal power supply, such as a secondary battery, ultra-capacitor, fuel cell, or the like.

The processing unit 200 may include one or more input/output controller 206 and associated input/output devices 208. The input devices 208a may include a touch screen or keyboard, a pointing device such as a mouse, and/or via a graphical user interface. Other input devices 208a can include a microphone, joystick, game pad, tablet, scanner, etc. Output devices 208b may include, for example, one or more speakers that provide an audible output for users of the processing unit 200. The output devices 208b may include one or more peripheral components that are separate from the processing unit 200, such as headphones or stand-alone speakers. Other output devices 208b may include a display, such as a flat panel computer display and/or a touchscreen or a touch sensitive display device, such as a resistive touch-screen or a capacitive touchscreen.

These and other input/output devices 208 are communicatively coupled to the processing unit 200 through an input/output interface 224 such as a serial port interface, although other interfaces such as a parallel port, an Ethernet port, a game port, or a universal serial bus ("USB") can be used. In some implementations, the input/output controller 206 and the input/output interface 224 may enable wireless communication between the processing unit 200 and peripheral input/output devices 208 through one or more radios and antenna compliant with one or more wireless protocols. Such wireless protocols may include, for example, Bluetooth™, IEEE 802.11b (or other Wi-Fi standards), infrared data association (IrDA), radiofrequency identification (RFID), or other such protocols that enable peripheral input/output devices 208 to communicate with the processing unit 200.

The processing unit 200 may include a network interface controller 210 that enables the processing unit 200 to communicate with one or more communications or data networks. Suitable communication protocols include FTP, HTTP, Web Services, SOAP with XML, WI-FI™ compliant, BLUETOOTH™ compliant, cellular (e.g., GSM, CDMA), and the like. Suitable transportation protocols include TCP/IP, SCTP, DCCP, and the like.

The transceiver 212 can include any device capable of transmitting and receiving communications via electromagnetic energy. The transceiver 212 may enable communications over one or more communications networks. In at least some instances, the transceiver 212 can include more than one interface. The transceiver 212 may enable communications over other types of wireless or wired networks, such as local area networks (LANs) or Wide Area Networks (WANs), and may include packet switched communications networks such as the Internet, Worldwide Web, extranets, and/or intranets. In some implementations, the transceiver 212 may include a CDMA transceiver, a GSM transceiver, a 3G transceiver, a 4G transceiver, an LTE transceiver, and any similar current or future developed computing device transceiver having at least one of a voice telephony capability or a data exchange capability.

The processing unit 200 may include one or more processor-readable memories 214. The processor-readable memories 214 may include one or more non-transitory storage media, for example one or more non-volatile and/or volatile non-transitory storage media, for instance one or more read only memories (ROM), random access memories (RAM), registers, Flash memory, spinning magnetic media and drive, spinning optical media and drive, etc. The processor-readable memories 214 may be used to store data 216, such as, for example, data related to the operation of the data collection system 100 and/or the scan engine 102.

The processor-readable memories 214 may store one or more operating systems 218, such as the iOS® operating system provided by Apple Inc., the Android® operating system provided by Google Inc., the Windows® Phone operating system provided by Microsoft Corp., or other similar operating systems. The processor-readable memories 214 may store one or more applications 220 that comprise logic or machine executable instructions that, when executed by the processor 202, provide functionality to the processing unit 200. In at least some instances, the applications 220 may be downloaded or otherwise acquired by the end user, for example using an online marketplace such as the Apple App Store, Amazon Marketplace, or Google Play marketplaces. In some implementations, such applications 220 may start up in response to selection of a corresponding user selectable icon by the user or consumer.

The applications 220 may further include: an OCR application 220a that may be operable to perform an OCR process on captured images; a DWM application 220b that may be operable to identify and validate DWMs included in images of machine-readable symbols 130 and/or objects 128; a decoding process or application 220c that may be operable to decode information from representations of machine-readable symbols 130; a database program 220d that may be operable to form a database structure in the processor-readable memories 214, as well as to store and search for data located within the database structure; and a user interface application 220e that may be operable to render a user interface to interact with and access the functionalities provided by the data collection system 100. Each of the host system 108, the auxiliary image processor 104, and/or the auxiliary visualizer 106 may include only some of the applications 220a-220e.

Figure 3:
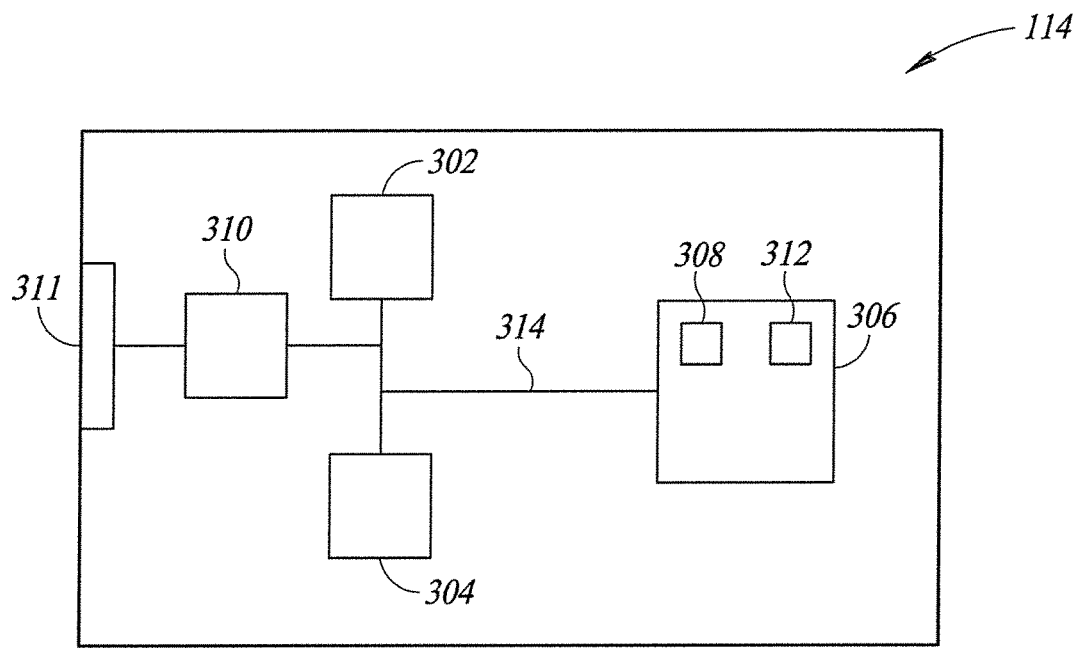
FIG. 3 is a block diagram of a set of decoding processor circuitry within a scan engine, according to at least one illustrated implementation.

FIG. 3 shows the set of decoding processor circuitry 114, according to at least one illustrated implementation. The set of decoding processor circuitry 114 may include at least one processor 302, a power supply 304, one or more processor-readable memories 306 that store data 308, and one or more applications 312, and a communications controller 310 and associated interface 311. Each of these components may be communicatively connected by bus(es) 314, which can provide bidirectional communication between the various components of the decoder processing unit 300. Bus(es) 314 may take, for example, the form of a plurality of buses (e.g., data buses, instruction buses, power buses) included in at least one body. The communications controller 310 and associated interface 311 may enable the set of decoding processor circuitry 114 to communicate with other components in the scan engine 102 and to provide an output on the second output interface 118.

The processor(s) 302 may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. The at least one processor 302 may be referred to in the singular, but may be two or more processors. The set of decoding processor circuitry 114 may also include one or more power supplies 304, which provide electrical power to the various components of the set of decoding processor circuitry 114 via power connections. The power supplies 304 may be an internal power supply, such as a secondary battery, ultra-capacitor, fuel cell, or the like. In some implementations, the set of decoding processor circuitry 114 may share a power supply 304 with the other components of the scan engine 102.

The decoding processor circuitry 114 may include one or more processor-readable memories 306. The processor-readable memories 306 may include one or more non-transitory storage media, for example one or more non-volatile and/or volatile non-transitory storage media, for instance one or more read only memories (ROM) 316, random access memories (RAM) 318, non-volatile memories 320, etc. The processor-readable memories 306 may be used to store data 308, such as, for example, data related to the decoding of information from machine-readable symbols 130. The processor-readable memories 306 may be used to store one or more applications 312, such as applications related to decoding information from machine-readable symbols.

Figure 4:
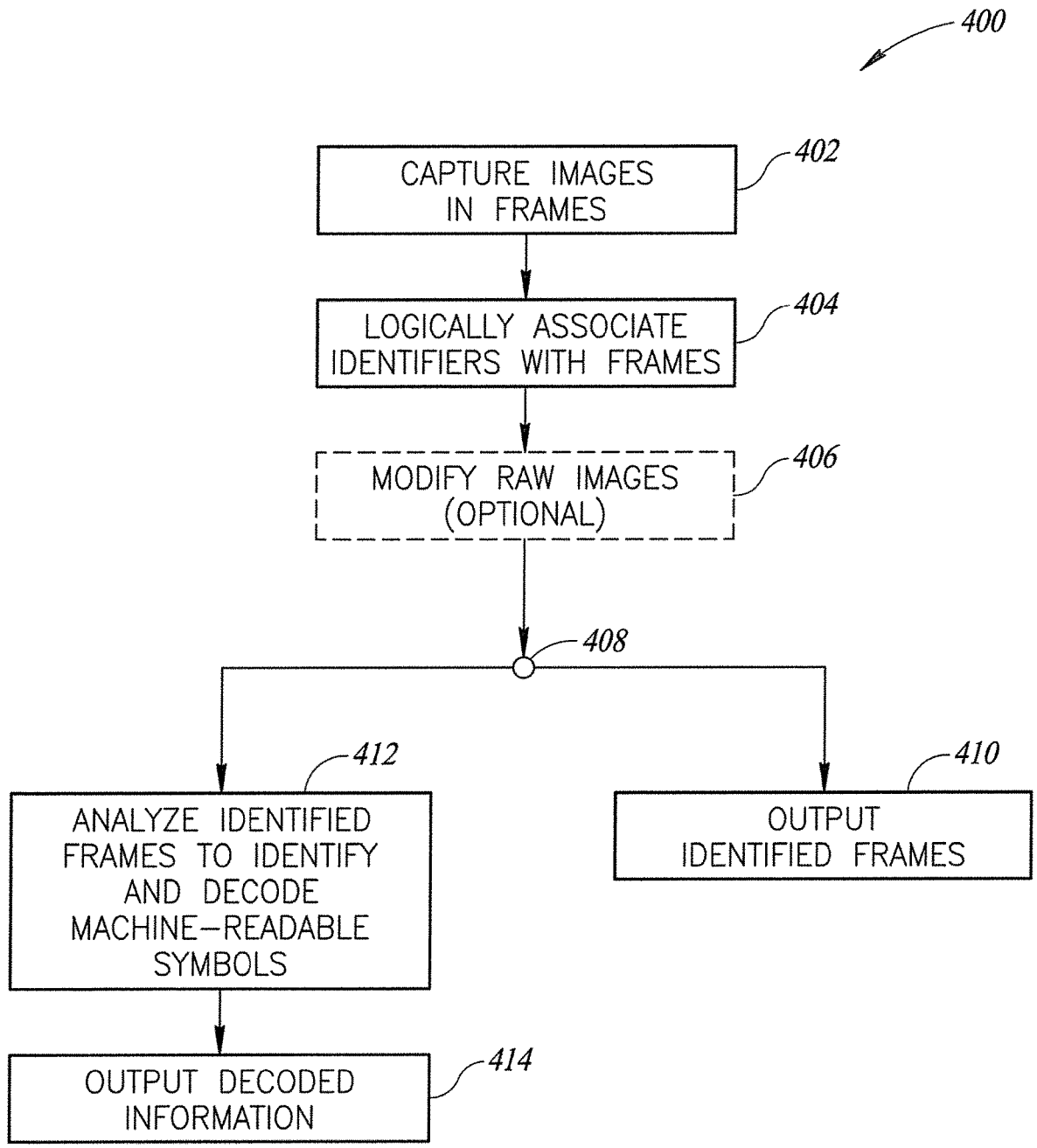
FIG. 4 is a flow diagram of a method of operation of a scan engine to capture images and associated data related to representations of machine-readable symbols captured within frames by a two-dimensional image sensor, according to at least one illustrated implementation.

FIG. 4 shows a method 400 of operation of a scan engine to capture images and associated data related to representations of machine-readable symbols, according to at least one illustrated implementation. At 402, images are captured by a two-dimensional image sensor 110 in a set of one or more frames 132. The set of frames 132 may form a set of streaming images and/or streaming video. Such frames 132 may be used to store raw image data of objects 128 that are located within the field-of-view 126 of the two-dimensional image sensor 110.

At 404, an identifier 134 is logically associated with each of the frames 132 in the set of frames 132 captured by the two-dimensional image sensor 110, resulting in a set of identified frames 136. In some implementations, the identifier 134 may be logically associated with each frame 132 by inserting the identifier 134 into each respective frame 132, such as, for example, by modifying at least some of the pixel data (e.g., bits) captured by the two-dimensional image sensor 110. In some implementations, the image processor circuitry 112 may insert the identifier 134 into a frame by modifying pixels located within areas or lines of optical black pixels that may be used to correct image distortions, noise, or other artifacts that may occur in the image.

At 406, the set of identified frames 136 of raw streaming image and/or video data is optionally modified to include metadata, as discussed above, which may include, for example, an identifier 134 for each frame 136 in the set of identified frames 136. In some implementations, a region-of-interest within one or more of the frames 136 in the set of identified frames 136 may be identified as part of 406. Such a region-of-interest may include, for example, a region in which at least some of the machine-readable symbol 130 has been captured. In such an implementation, one or more of the frames 136 in the set of identified frames 136 may be subdivided into different regions, with only a subset of the regions (e.g., those regions in which a region-of-interest has been fully or partially captured) being forwarded for additional processing.

At 408, the method 400 may split into two parallel paths that are both executed.

At 410, the set of identified frames 136, which may have optionally been modified at 406, is output to a first output interface 116. The first output interface 116 may be any type of output connector that may be used to transmit image and/or video data via, for example, a MIPI CSI-2 formatted video and/or image stream.

At 412, at least some of the identified frames 136 are analyzed by a set of decoding processor circuitry 114. The analysis may include, for example, decoding information contained within one or more representations of machine-readable symbols 130 captured in the identified frames 136.

At 414, at some of the decoded information may be output to a second output interface 118. The second output interface 118 may include one or more interfaces that may be used to connect to a data or communications network, such as, for example, a Universal Serial Bus (USB) interface, a RS-232 interface, or any other wireless or wired interface that may connect using, for example, Wi-Fi, Ethernet, Bluetooth, ZigBee or any other acceptable communication protocol.

Figure 5:
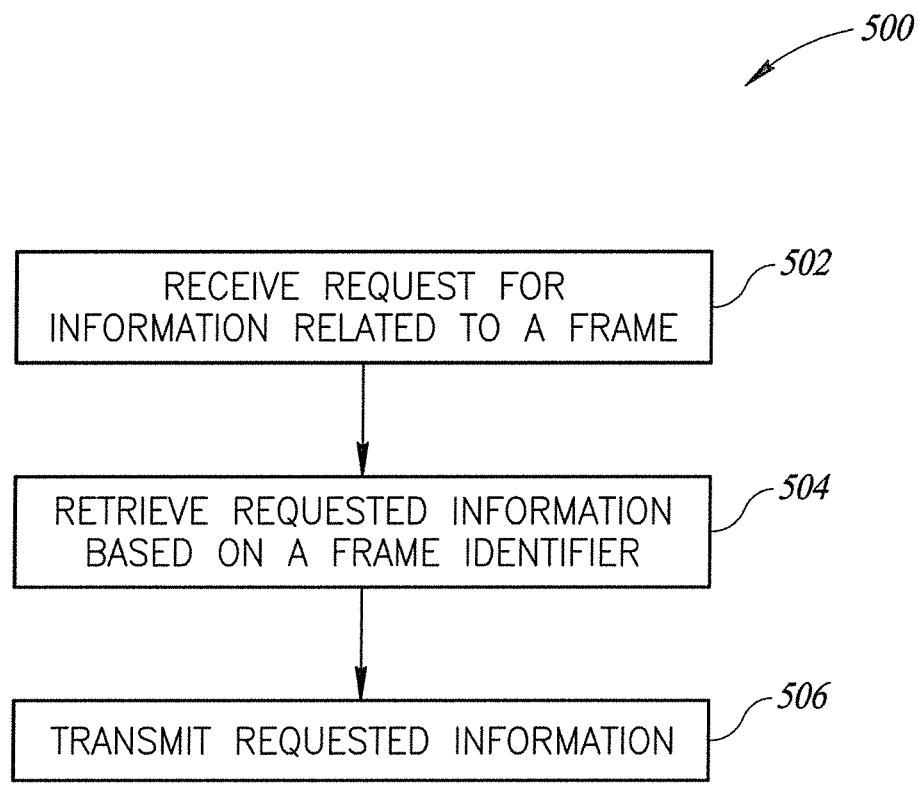
FIG. 5 is a flow diagram of a method of operation of a data collection system to provide to a host system requested information related to frames based upon one or more identifiers that have been logically associated with such frames, according to at least one illustrated implementation.

FIG. 5 shows a method of operation of a data collection system 100 to display via a host system 108 synchronized images of representations of machine-readable symbols 130 captured by a two-dimensional image sensor 110 along with associated information decoded from the respective machine-readable symbols 130, according to at least one illustrated implementation.

At 502, a request is received from the host system 108 for information related to an identified frame 136. Such a request may be received, for example, by the auxiliary image processor 104 and/or to the auxiliary visualizer 106. In some implementations, the request may include the identifier 134 associated with the identified frame 136. In some implementations, the request may be generated as a result of user input via, for example, the user interface 146.

In some implementations, the request may be generated automatically by the host system 108, as a result, for example, of an alarm or other alert signal that may be generated based on decoded information related to a representation of a machine-readable symbol 128 captured in the identified frame 136.

At 504, the additional information associated with the identified frame 136 is retrieved. The additional information may include, for example, OCR information, DWM information, additional and/or duplicate decoded information from the representation of the machine-readable symbol 130, and/or video or image data associated with the identified frame.

At 506, the additional information is transmitted to the host system 108. The additional data may optionally be displayed to the user via the user interface 146.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A data collection system, comprising:
 a scan engine comprising:
  a two-dimensional image sensor having a field-of-view, and which in operation captures a sequence of frames of two-dimensional images;
  a set of image processor circuitry communicatively coupled to the two-dimensional image sensor to receive at least some of the frames of two-dimensional images therefrom, and which in operation logically associates a respective identifier with each of the frames of two-dimensional images, the respective identifier which uniquely identifies the respective frame of the two-dimensional images for other ones of the frames of two-dimensional images in the sequence of frames of two-dimensional images;
  a set of decoding processor circuitry directly or indirectly communicatively coupled to the two-dimensional image sensor to receive at least some of the frames of two-dimensional images therefrom, and which in operation decodes a number of machine-readable symbols represented in the frames of two-dimensional images;
  a first output interface communicatively coupled to the set of image processor circuitry to provide, therefrom, a set of the frames of two-dimensional images with the respective identifiers as at least one of raw two-dimensional images or two-dimensional images as captured by the two-dimensional image sensor, with only the respective identifiers appended thereto; and
  a second output interface communicatively coupled to the set of decoding processor circuitry to provide, therefrom, information decoded from machine-readable symbols by the set of decoding processor circuitry, in parallel with the set of the frames of two-dimensional images with the respective identifiers provided by first output interface.

2. The data collection system of claim 1 wherein the set of decoding processor circuitry is indirectly communicatively coupled to the two-dimensional image sensor via the set of image processor circuitry.

3. The data collection system of claim 2, further comprising:
 at least a first auxiliary image processor communicatively coupled to the first output interface to receive the set of frames of two-dimensional images, wherein the first auxiliary image processor further includes a set of data management processing circuitry which in operation performs one or more computational tasks related to the two-dimensional images in one or more of the frames in the set of frames of two-dimensional images.

4. The data collection system of claim 2, further comprising:
 at least a first auxiliary visualizer communicatively coupled to the first output interface to receive the set of frames of two-dimensional images, wherein the first auxiliary visualizer renders the set of frames of two-dimensional images.

5. The data collection system of claim 2, further comprising:
 a host system communicatively coupled, directly or indirectly, to the first output interface to receive the set of frames of two-dimensional images, at least one machine-readable symbol represented in the set of frames of two-dimensional images, and the host system communicatively coupled, directly or indirectly, to the second output interface to receive decoded information related to the at least one represented machine-readable symbol, the host system to synchronize a display of the set of frames of two-dimensional images in which the at least one machine-readable symbol is represented with the decoded information related to the at least one machine-readable symbol.

6. The data collection system of claim 1 wherein to logically associate a respective identifier with each of the frames of two-dimensional images, the set of image processor circuitry inserts the respective identifier into each of the frames of two-dimensional images.

7. The data collection system of claim 1 wherein to logically associate a respective identifier with each of the frames of two-dimensional images, the set of image processor circuitry inserts a respective frame identifier into each of the frames of two-dimensional images.

8. The data collection system of claim 1 wherein to logically associate a respective identifier with each of the frames of two-dimensional images, the set of image processor circuitry inserts a respective time stamp into each of the frames of two-dimensional images.

9. The data collection system of claim 1 wherein to logically associate a respective identifier with each of the frames of two-dimensional images, the set of image processor circuitry modifies a number of pixels within each of the frames.

10. The data collection system of claim 1 wherein to logically associate a respective identifier with each of the frames of two-dimensional images, the set of image processor circuitry encodes the respective identifier into optical black pixels for each frame.

11. The data collection system of claim 1 wherein the set of image processor circuitry is at least one of a field programmable gate array, a complex programmable logic device, or a mobile industry processor interface (MIPI) bridge.

12. The data collection system of claim 1 wherein the set of decoding processor circuitry comprises at least one central processor unit, at least one random access memory, and at least one nonvolatile memory, the at least one random access memory and the at least one nonvolatile memory communicatively coupled to the at least one central processor unit.

13. The data collection system of claim 1 wherein the scan engine is an integral module.

14. The data collection system of claim 1 wherein the first output interface is a video interface and the second output interface is one of a USB interface or an RS232 interface.

15. A data collection system comprising:
a scan engine comprising:
a two-dimensional image sensor having a field-of-view, and which in operation captures a sequence of frames of two-dimensional images;
a set of image processor circuitry communicatively coupled to the two-dimensional image sensor to receive at least some of the frames of two-dimensional images therefrom, and which in operation logically associates a respective identifier with each of the frames of two-dimensional images, the respective identifier which uniquely identifies the respective frame of the two-dimensional images for other ones of the frames of two-dimensional images in the sequence of frames of two-dimensional images;
a set of decoding processor circuitry directly or indirectly communicatively coupled to the two-dimensional image sensor to receive at least some of the frames of two-dimensional images therefrom, and which in operation decodes a number of machine-readable symbols represented in the frames of two-dimensional images;
a first output interface communicatively coupled to the set of image processor circuitry to provide, therefrom, a set of the frames of two-dimensional images with the respective identifiers; and
a second output interface communicatively coupled to the set of decoding processor circuitry to provide, therefrom, information decoded from machine-readable symbols by the set of decoding processor circuitry, in parallel with the set of the frames of two-dimensional images with the respective identifiers; and
at least a first auxiliary image processor communicatively coupled to the first output interface to receive the set of frames of two-dimensional images, wherein the first auxiliary image processor further includes a set of data management processing circuitry which in operation performs one or more computational tasks related to the two-dimensional images in one or more of the frames in the set of frames of two-dimensional images.

16. A data collection system comprising:
a scan engine comprising:
a two-dimensional image sensor having a field-of-view, and which in operation captures a sequence of frames of two-dimensional images;
a set of image processor circuitry communicatively coupled to the two-dimensional image sensor to receive at least some of the frames of two-dimensional images therefrom, and which in operation logically associates a respective identifier with each of the frames of two-dimensional images, the respective identifier which uniquely identifies the respective frame of the two-dimensional images for other ones of the frames of two-dimensional images in the sequence of frames of two-dimensional images;
a set of decoding processor circuitry directly or indirectly communicatively coupled to the two-dimensional image sensor to receive at least some of the frames of two-dimensional images therefrom, and which in operation decodes a number of machine-readable symbols represented in the frames of two-dimensional images;
a first output interface communicatively coupled to the set of image processor circuitry to provide, therefrom, a set of the frames of two-dimensional images with the respective identifiers; and
a second output interface communicatively coupled to the set of decoding processor circuitry to provide, therefrom, information decoded from machine-readable symbols by the set of decoding processor circuitry, in parallel with the set of the frames of two-dimensional images with the respective identifiers; and
at least a first auxiliary visualizer communicatively coupled to the first output interface to receive the set of frames of two-dimensional images, wherein the first auxiliary visualizer renders the set of frames of two-dimensional images.

17. A data collection system comprising:
a scan engine comprising:
a two-dimensional image sensor having a field-of-view, and which in operation captures a sequence of frames of two-dimensional images;
a set of image processor circuitry communicatively coupled to the two-dimensional image sensor to receive at least some of the frames of two-dimensional images therefrom, and which in operation logically associates a respective identifier with each of the frames of two-dimensional images, the respective identifier which uniquely identifies the respective frame of the two-dimensional images for other ones of the frames of two-dimensional images in the sequence of frames of two-dimensional images;
a set of decoding processor circuitry directly or indirectly communicatively coupled to the two-dimensional image sensor to receive at least some of the frames of two-dimensional images therefrom, and which in operation decodes a number of machine-readable symbols represented in the frames of two-dimensional images;
a first output interface communicatively coupled to the set of image processor circuitry to provide, therefrom, a set of the frames of two-dimensional images with the respective identifiers; and
a second output interface communicatively coupled to the set of decoding processor circuitry to provide, therefrom, information decoded from machine-readable symbols by the set of decoding processor circuitry, in parallel with the set of the frames of two-dimensional images with the respective identifiers; and
a host system communicatively coupled, directly or indirectly, to the first output interface to receive the set of frames of two-dimensional images, at least one machine-readable symbol represented in the set of frames of two-dimensional images, and the host system communicatively coupled, directly or indirectly, to the second output interface to receive decoded information related to the at least one represented machine-readable symbol, the host system to synchronize a display of the set of frames of two-dimensional images in which the at least one machine-readable symbol is represented with the decoded information related to the at least one machine-readable symbol.

18. The data collection system of claim 17, further comprising:
a set of user interface processor circuitry on the host system, the user interface processor circuitry in operation to control the display of the frames of two-dimensional images based on an input signal associated with a user.

19. The data collection system of claim 1 wherein the identifier includes an identifier for the scan engine, a location of the scan engine, an area encompassed by a field-of-view for the scan engine, or a name of a component or process within the field-of-view for the scan engine.

20. The data collection system of claim 1 wherein the set of the frames of two-dimensional images with the respective identifiers is provided by first output interface as a video stream.

* * * * *